April 3, 1956  W. L. SHEPPARD  2,740,304
TRANSMISSION AND CONTROLS THEREFOR
Filed Nov. 2, 1951  6 Sheets-Sheet 1
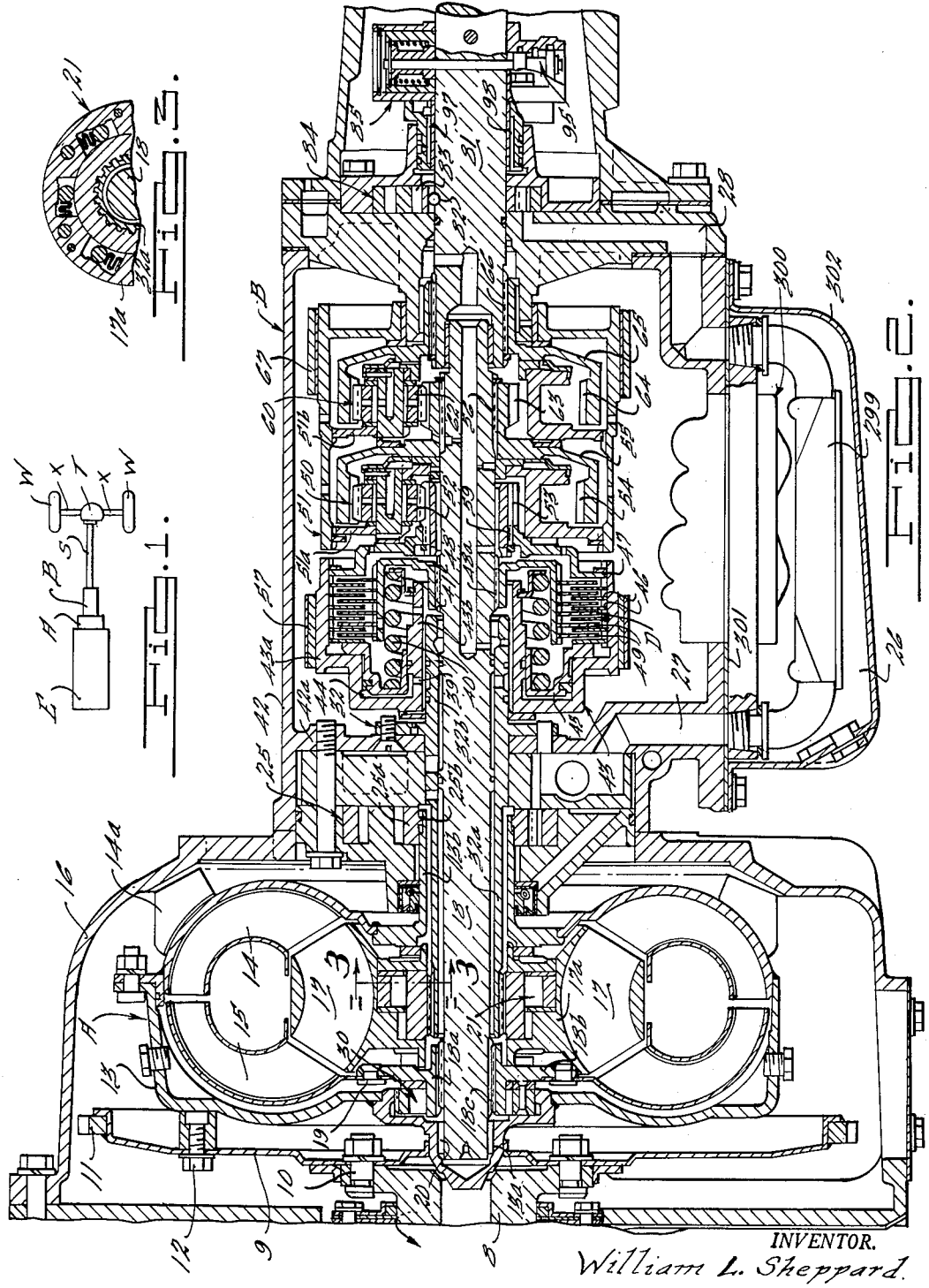
INVENTOR.
William L. Sheppard
BY
Harness and Harris
ATTORNEYS.

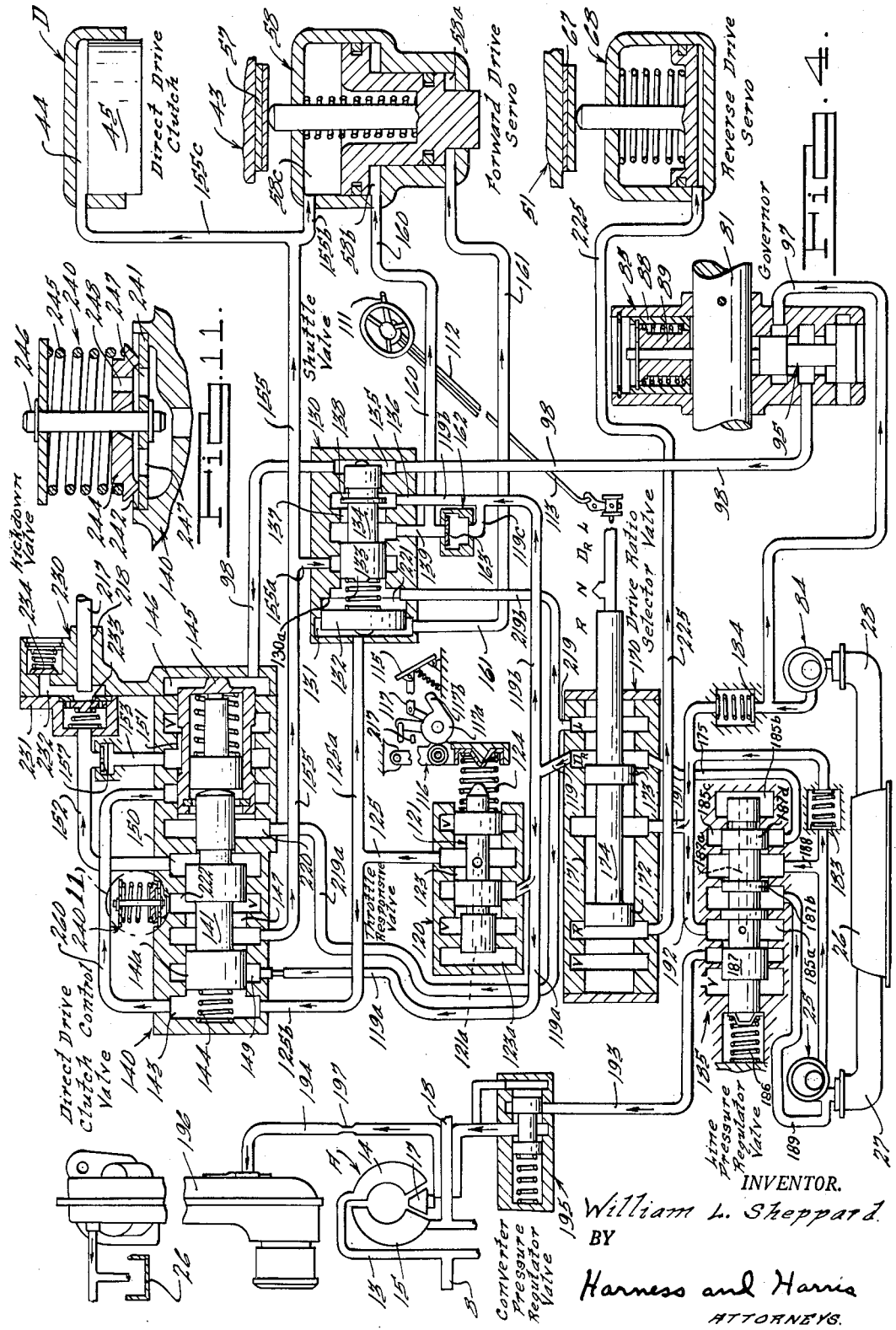

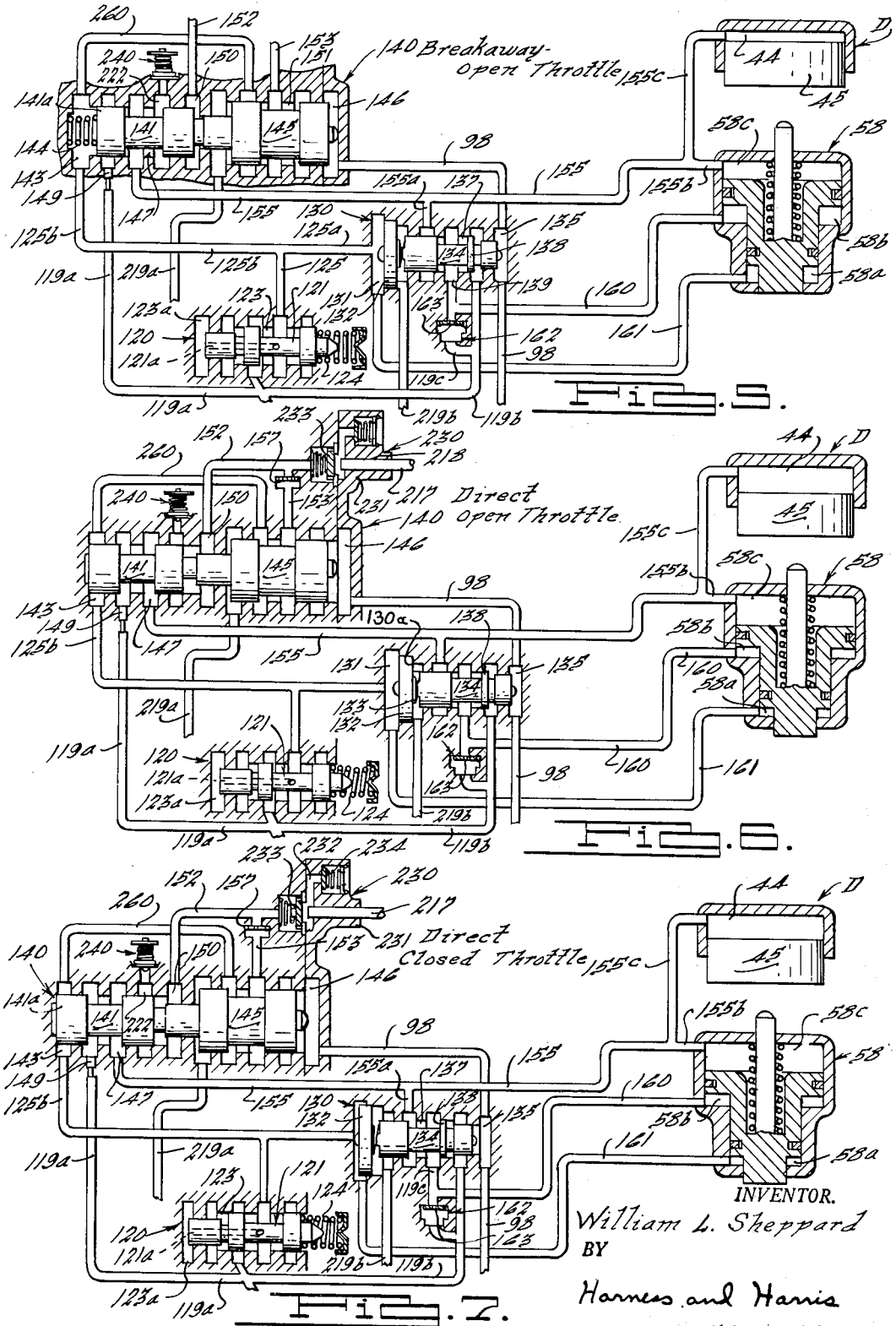

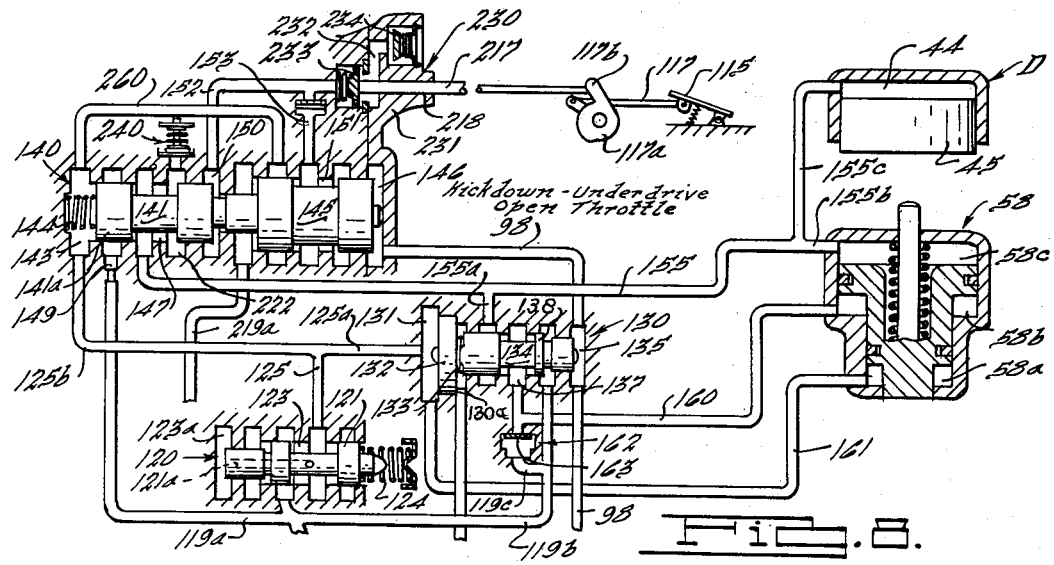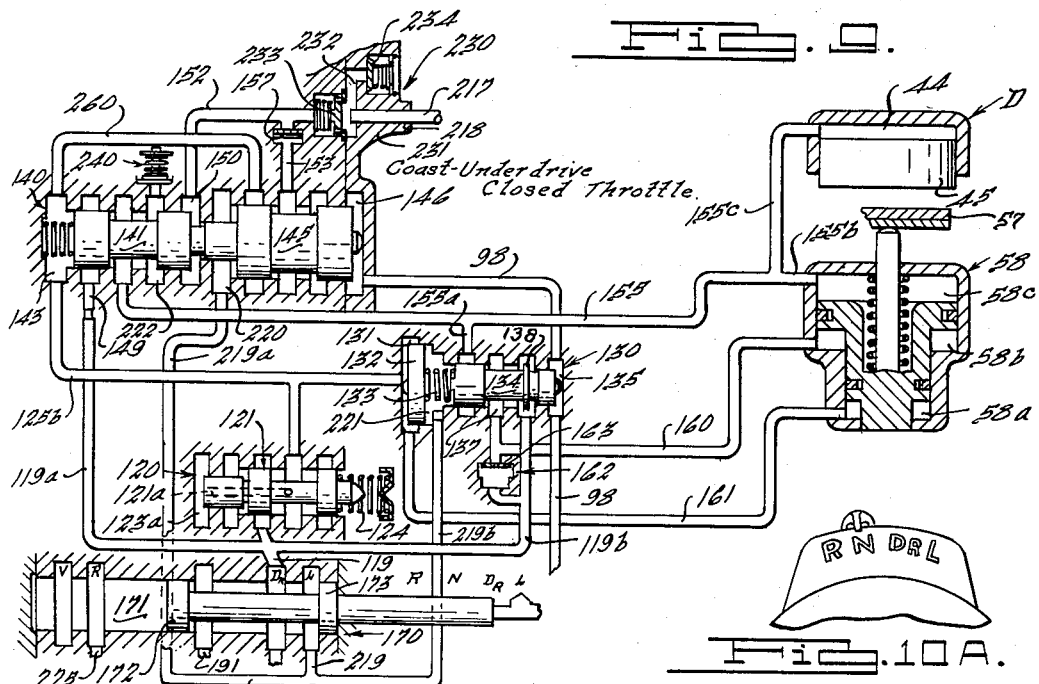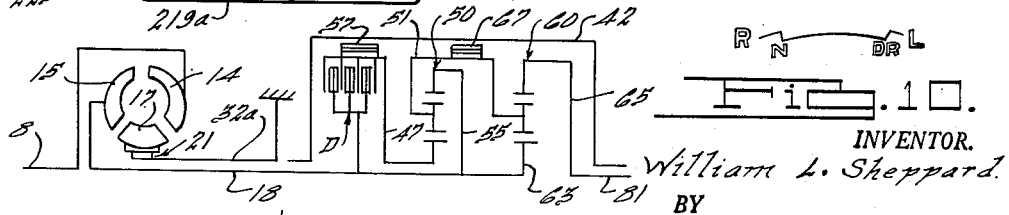

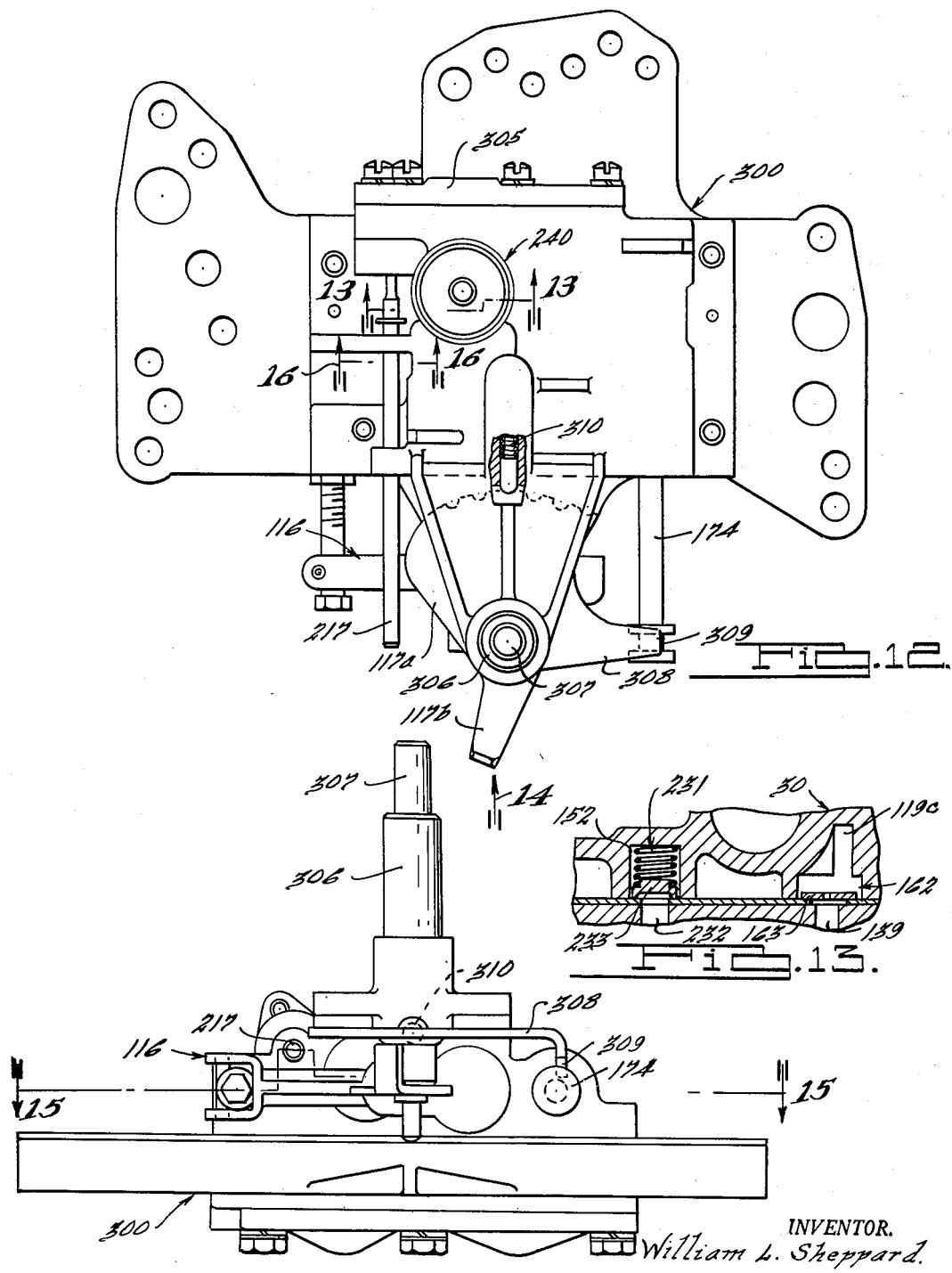

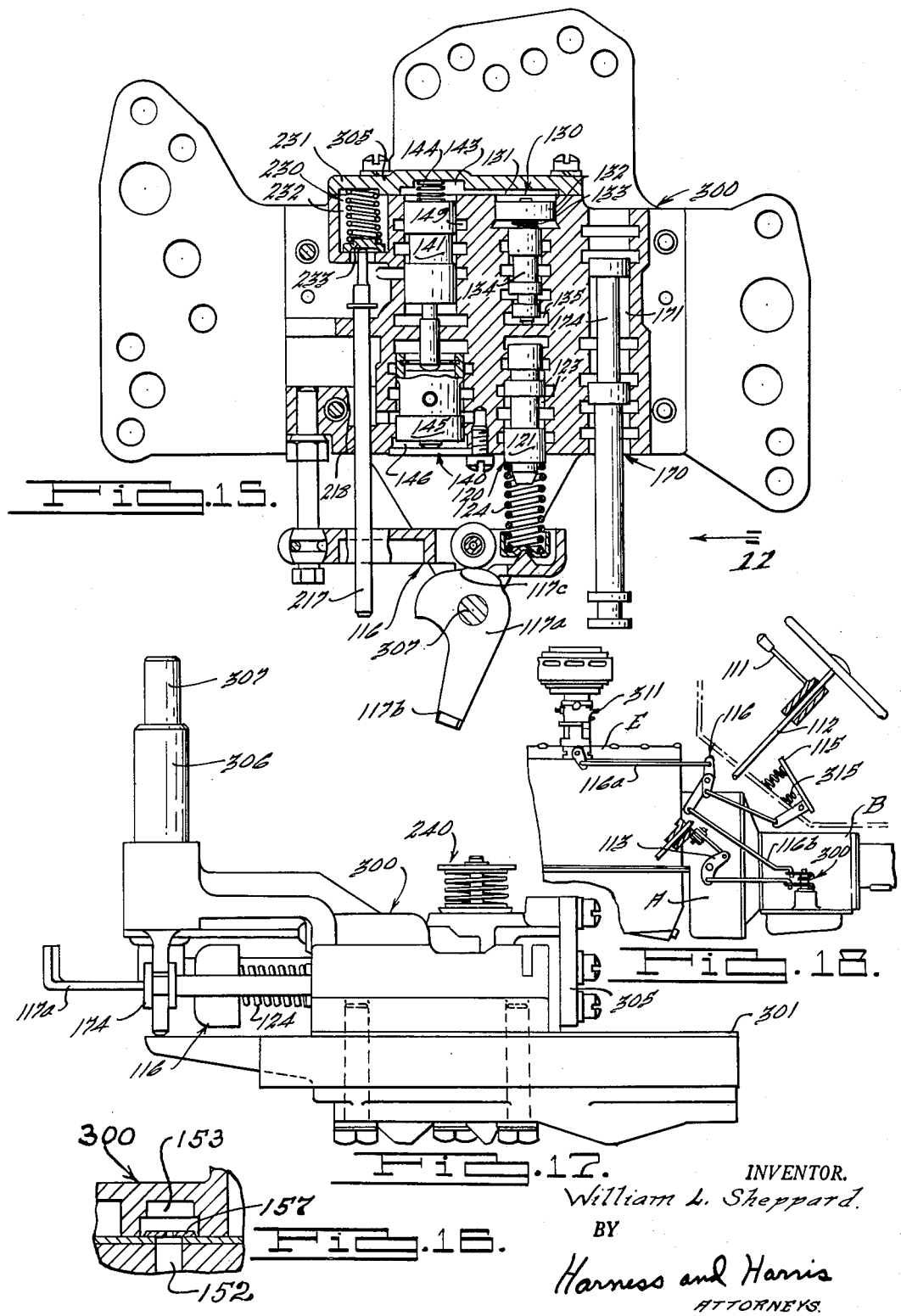

United States Patent Office 2,740,304
Patented Apr. 3, 1956

2,740,304

TRANSMISSION AND CONTROLS THEREFOR

William L. Sheppard, Romulus, Mich., assignor to Chrysler Corporation, Highland Park, Mich., a corporation of Delaware Application November 2, 1951, Serial No. 254,531

28 Claims. (Cl. 74—472)

This invention relates to power transmission units primarily adapted for motor vehicle drive and particularly to the hydraulically operated control system that automatically operates the speed ratio change mechanism associated with a power transmission unit of this general type.

It is a primary object of this invention to arrange the control valving such that smooth, fast, upshifts and downshifts in speed ratio drive are assured under all driving conditions.

It is a further object of this invention to associate a shuttle valve with the direct drive clutch control valve and with the forward underdrive control servo mechanism such that fast, smooth speed ratio changes are obtainable due to the rapid fill pressure fluid supply arrangement provided for the control valve and the servo mechanism chambers or bores.

It is still another object of this invention to associate a shuttle valve with the direct drive clutch control valve and with the forward underdrive control servo mechanism such that a smooth, cushioned application of the underdrive brake band is obtainable on release of the direct drive clutch during a speed ratio change downshift from direct drive to underdrive.

It is still another object of this invention to associate a pressure fluid flow restriction valve with the pressure fluid supply for the aforementioned servo mechanism and with the shuttle valve control for the servo mechanism so as to improve the operation of the servo mechanism.

It is still another object of this invention to provide a pressure reducing valve for a shift control valve whereby venting of portions of the shift control valve during actuation thereof is retarded in such a manner that a smooth cushioned speed ratio change is obtainable.

It is still another object of this invention to provide a kickdown valve for driver controlled downshifts that will permit fast downshifts without unnecessary bleeding of the control system of its operating pressure fluids.

Other objects and advantages of this invention will become readily apparent from a reading of the following description of this invention and a consideration of the drawings relating thereto.

Fig. 1 is a schematic view of a motor vehicle drive train that includes a power transmission unit embodying this invention;

Fig. 2 is a sectional elevational view of the power transmission unit utilized in the disclosed drive train of Fig. 1;

Fig. 3 is an enlarged, fragmentary sectional, elevational view of the one-way brake mechanism associated with the guide wheel of the drive train torque converter device, the view being taken on the line 3—3 of Fig. 2;

Fig. 4 is a diagrammatic view of the hydraulically operated control system for this power transmission unit when the control valving thereof is set for neutral and the throttle valve is closed or in engine idle position;

Fig. 5 is a fragmentary diagrammatic sketch of portions of the control valving shown in Fig. 4 when the valving has been set for the "breakaway" forward drive and the throttle valve has been opened sufficiently to accelerate the vehicle to a speed of approximately 22 M. P. H. in the forward underdrive ratio;

Fig. 6 is a fragmentary diagrammatic sketch of portions of the control valving shown in Fig. 4 when the valving has been automatically upshifted to the positions for producing the forward direct drive ratio and the throttle valve is partially opened to provide a vehicle speed of above 22 M. P. H.;

Fig. 7 is a fragmentary diagrammatic sketch of portions of the control valving shown in Fig. 4 when the valving has been automatically upshifted to the positions for transmitting the forward direct drive ratio and the throttle valve is closed with the vehicle speed above approximately 27 M. P. H.;

Fig. 8 is a fragmentary diagrammatic view of portions of the control valving shown in Fig. 4 after the engine accelerator pedal has been sufficiently depressed to effect a kickdown to the forward underdrive ratio from the direct drive ratio with the vehicle speed above approximately 22 M. P. H.;

Fig. 9 is a fragmentary diagrammatic view of portions of the control valving shown in Fig. 4 when the drive ratio selector lever has been placed in the low forward drive position to lock the transmission in the forward underdrive ratio for coast drive braking purposes, the throttle valve being closed at this time and the vehicle speed being in the lower speed range although the conditions remain the same at high speeds;

Fig. 10 is a diagrammatic view in side elevation of the shift positions of the drive ratio selector lever;

Fig. 10A is a plan view of the drive ratio selector lever shift quadrant;

Fig. 11 is an enlarged, fragmentary, sectional elevational view of the relief valve mechanism that is associated with the direct drive clutch control valve to insure smooth coast drive downshifts from the forward direct drive ratio to the forward underdrive ratio;

Fig. 12 is a top plan elevational view, with portions broken away, of the valve body unit used to control operation of this power transmission unit;

Fig. 13 is an enlarged fragmentary, sectional elevational view of the portions of the valve body disclosing the kickdown relief valve and the forward drive servo flow restriction valve, the view being taken along the line 13—13 of Fig. 12;

Fig. 14 is a side elevational view of the valve body shown in Fig. 12, the view being taken in the direction of the arrow 14 applied to Fig. 12;

Fig. 15 is a sectional elevational view of portions of the valve body unit, the view taken along the line 15—15 of Fig. 14;

Fig. 16 is an enlarged fragmentary sectional elevational view of the lag relief valve for the kickdown valve mechanism, the view being taken along the line 16—16 of Fig. 12;

Fig. 17 is a side elevational view of the valve body unit, the view being taken in the direction of the arrow 17 applied to Fig. 15;

Fig. 18 is a side elevational view of a motor vehicle power plant employing this power transmission unit and the control mechanisms herein disclosed; and Fig. 19 is a schematic line view of the power transmitting elements of this power transmission unit.

Fig. 1 of the drawings diagrammatically discloses a motor vehicle power plant and drive train comprising an internal combustion engine E drivingly connected to a power transmission unit that consists of the hydrokinetic type of torque converter device A drivingly connected to a change speed gear box B. The output from gear box B drives a propeller shaft or drive shaft S that transmits drive through a differential unit T and axles X to the rear wheels W of the vehicle.

Fig. 2 of the drawings discloses the power transmission unit structure that consists of the hydrokinetic torque converter device A and the change speed gear box B that are arranged in a series connected drive transmitting relationship. The reference numeral 8 represents an end portion of a driving member, such as the crankshaft of the engine E of the motor vehicle power plant. The shaft 8 is drivingly connected to the somewhat axially flexible drive transmitting plate 9 by the screw means 10. The drive transmitting plate 9 has an engine starter ring gear 11 fixedly mounted thereon and seated in a step-like formation extending about the periphery of plate 9. Drivingly connected to the drive plate 9, by the screw means 12, is the torque converter casing 13. Within casing 13 are mounted several vaned converter wheel elements, namely, the impeller or pump member 14, the turbine or runner member 15, and the guide or stator member 17. A pair of guide wheels may be used in place of the single guide wheel 17 if increased converter efficiency is desired.

The vaned impeller wheel 14 is formed as an integral part of the converter casing 13 and is accordingly adapted to be rotatably driven by the driving shaft 8. Air circulating vanes 14a may be mounted on the exterior of impeller 14 to assist in cooling the converter fluid. Suitable air inlet and outlet ports (not shown) are provided in the housing 16 to permit passage of cooling air about the converter casing 13 on rotation of the vanes 14a. The vaned turbine wheel 15 is drivingly connected by rivet means 19 to a radially extending flange portion 18b formed on a shaft hub member 18a. Shaft hub member 18a is drivingly connected by splines 18c to the forward end portion of the intermediate driven shaft member 18. A one-way clutch 30 is connected between the hub member 18a and the converter casing 13 to prevent shaft 18 overrunning casing 13 in a forward drive direction. Clutch 30 facilitates pushed or towed starts.

The intermediate shaft member 18 is adapted to transmit drive from the turbine member 15 of the torque converter device A to the planetary gearing of the gear box unit B that is arranged rearwardly of and in series with the torque converter device A. The forward end of intermediate shaft 18 is journalled in a bearing 20 that is piloted in an axially extending seat 13a formed in the hub of the torque converter casing 13. The rear end portion of intermediate shaft 18 is rotatably supported by a sleeve plate 32 carried by the housing 42 of the gear box B.

The vaned guide wheel 17 is rotatably mounted within the converter casing 13 by means of the guide wheel hub portion 17a. Guide wheel hub portion 17a is supported by means of the one-way brake device 21, on the axially extending sleeve portion 32a of the sleeve plate 32. Sleeve plate 32 is fixed to and projects from the wall 42a of the relatively stationary gear box housing 42. The one-way brake 21 is arranged such that it will permit only forward rotary movement (clockwise when looking from the converter A towards the gear box B) to be transmitted to the guide wheel 17 by the forward rotation of the impeller 14. The brake 21 continuously prevents rotation of the guide wheel 17 in a reverse or counterclockwise direction. The specific one-way brake 21 herein disclosed is shown in section in Fig. 3 and is specifically covered by the copending application of William T. Dunn, Serial No. 205,534, filed January 11, 1951, now abandoned.

The torque converter unit A includes a gear type oil pump 25 having a driving gear 25a that is directly connected by key means 25b to the rearwardly projecting end of an axially extending, sleeve-like, flange portion 13b of the rotatable converter casing 13. The pump 25 draws oil from a supply sump 26 through supply conduit 27 and circulates this oil through the converter A, the transmission unit lubricating system and the various, subsequently described, hydraulically operated, control mechanisms associated with this power transmission unit (see Fig. 4). A second pump 84, driven by the transmission output shaft 81, is also included in this transmission unit. The second pump 84 provides a second source of pressure fluid for operation of the various aforementioned hydraulically operated devices and insures a pressure fluid supply even at times when the engine driven pump 25 might not be operating. Pump 84 will thus provide pressurized fluid during pushed or towed starting as well as during engine driven operation of the vehicle.

The gear box B includes the direct drive clutch D and the pair of planetary gear trains 50 and 60 that are adapted to cooperate with the torque converter device A to provide means for the transmission of forward and reverse drives to the output shaft 81 that is connected to the propeller shaft S.

The sleeve plate 32, that is detachably mounted on the forward wall 42a of the gear box housing 42, includes a rearwardly directed, axially extending, sleeve-like flange 32b that rotatably supports the drum element 43 of the direct drive clutch D. Drum element 43 has an outer peripheral, axially extending, surface 43a that is adapted to be engaged by the brake band 57 to anchor the drum 43 against rotation. Drum 43 is shaped so as to provide an axially extending piston receiving bore 44. Within bore 44 is reciprocably mounted a piston 45. The drum peripheral portion 43a has drivingly connected thereto a plurality of radially extending, axially shiftable, clutch plates 46 and a backing plate 47. The drum 43 and its plates 46 and 47 normally constitute the driven side of the direct drive clutch D. The driving side of clutch D is composed of the spider element 48 that is splined at 48a to the intermediate shaft 18. Spider element 48 has a group of radially extending, axially shiftable, clutch plates 49 drivingly connected thereto and arranged so as to extend between the aforementioned clutch plates 46. An axially extending spring 40, that is concentrically arranged about the sleeve plate flange portion 32b, is positioned to extend between the piston 45 and an anchor ring 41 that is fixed to the portion 43b of the drum 43. Spring 40 continuously urges the piston 45 forwardly to a clutch disengaged position.

On admission of pressure fluid to piston bore 44 through inlet channel 39, the piston 45 will be forced rearwardly to clampingly engage the clutch plates 46, 49 between the piston 45 and backing plate 47. On release of the pressure fluid from bore 44, the piston 45 will be moved forwardly by spring 40 to its clutch disengaged position.

The forwardly positioned planetary gear train 50 that is adapted to be activated to provide means for transmitting a forward underdrive ratio through this power transmission unit gear box B includes the drum-like planet pinion carrier 51. Carrier 51 has a forward wall portion 51a that rotatably supports a plurality (only one shown) of planet pinion gears 52. A sun gear element 53 is arranged in meshing engagement with the planet pinions 52. Sun gear element 53 is carried by and drivingly connected at 59 to the backing plate member 47 of the direct drive clutch D. Accordingly, drive may be transmitted from shaft 18 through spider 48, clutch plates 46, 49 and backing plate 47 to sun gear 53 whenever clutch D is engaged. The planet pinions 52 of gear train 50 are also in meshing engagement with the annulus gear 54 that is carried by a spider element 55. Spider element 55 is drivingly connected to the intermediate shaft 18 by the splines 56. The brake band 57, that was previously mentioned in the description of the direct drive clutch D, is adapted to be applied to drum element 43a of clutch D to anchor the sun gear 53 of planetary 50 against rotation. Band 57 is applied to drum 43 by means of the servo mechanism 58 (see Fig. 4). Application of band 57 to drum 43 activates planetary gear train 50 for the transmission of a forward underdrive ratio from input shaft 18 to output shaft 81 by means subsequently described. The transmission of the forward underdrive ratio is through planetary gear trains 50 and 60 which function in a compounded relationship for the transmission of forward drive. The means utilized for the transmission of this forward underdrive ratio will become more apparent after reading the description of reverse drive planetary gear train 60.

Rearwardly positioned, reverse drive planetary gear train 60 includes the planet pinion carrier plate 51b that is supported by the drum-like planet pinion carrier element 51. Rotatably mounted on carrier plate 51b are a plurality (only one shown) of planet pinion gears 62. Planet pinion gears 62 are arranged in meshing engagement with the sun gear element 63. Sun gear 63 is drivingly connected to the intermediate shaft 18 through splines 56. In the construction disclosed, it will be noted that the sun gear 63 of the rear planetary gear train 60 is integral with the annulus gear 54 of the forwardly positioned forward drive planetary gear train 50. Meshing with and surrounding the planet pinion gears 62 is an annulus gear 64. Annulus gear 64 has its supporting spider element 65 drivingly connected by splines 66 to the gear box output shaft 81. A brake band 67, that encircles the rear end portion of the drum-like carrier member 51, is arranged to be engaged with carrier 51 to anchor the carrier 51 against rotation. Band 67 is applied to carrier 51 by means of the servo mechanism 68 (see Fig. 4). Application of band 67 to the planet pinion carrier 51, while direct drive clutch D is disengaged, will activate rear planetary gear train 60 from the transmission of a reverse drive from intermediate shaft 18 through sun and planet gears 63, 62 respectively to the annulus gear 64 which latter gear is drivingly connected to the output shaft. This specific gear box is not a part of the invention herein claimed but is covered by the application of Augustin J. Syrovy et al., Serial No. 238,646, filed July 26, 1951.

It will be noted that the gear box B has the planetary gear trains 50, 60 arranged such that the box is quite advantageous from economic, operational and production standpoints. First, the input to either the forward or reverse underdrive ratio gear trains 50, 60 respectively, is from the same input element, namely the spider element 55, due to the fact that both the forward drive train annulus gear 54 and the reverse drive train sun gear element 63 are integrally formed with the spider element 55 that is drivingly connected to the torque converter driven input shaft 18. Second the output from either of the gear trains 50, 60 to the output shaft 81 is through the same element, namely the annulus gear 64 that is drivingly connected to the output shaft and arranged for transmission of drive from either of the gear trains 50, 60. This results from the fact that the gear train 50 is compounded with the gear train 60 for the forward underdrive ratio whereas the gear train 60 operates singly for the transmission of the reverse drive. Third, a single planet pinion carrier drum 51 is utilized to bridgingly connect and support the pair of planet pinion carriers 51a, 51b. Fourth, the gearing arrangement is such that similar gears are used as pinion gears in each of the two gear trains 50, 60. This is quite advantageous from a manufacturing and assembly standpoint.

With the power transmission unit herein disclosed it is possible to initiate forward drive through a high torque multiplication forward underdrive ratio that is automatically convertible into a fluid cushioned, two-way, forward direct drive at the most advantageous point depending on the driving conditions encountered. The final fluid cushioned direct drive ratio, being transmitted through the fluid of the torque converter A, is particularly suited for smooth downshifts to the underdrive ratio. This drive arrangement also reduces the possibility of engine stall at very low vehicle speeds while the transmission is set for the direct drive ratio.

Whenever forward drive is to be initiated through the transmission direct drive clutch D is initially disengaged and braking band 57 is applied to the clutch drum portion 43a to anchor the sun gear 53 of forward drive planetary gear train 50 against rotation. With sun gear 53 anchored against rotation the gear train 50 is activated and torque converter driven input shaft 18 causes the forward drive train annulus 54 to drive the pinion gears 52 and the pinion gear carrier 51 forwardly or clockwise. As a result of the pinion gear carrier 51 rotating clockwise the several planet pinions 62 of the reverse drive gear train 60 are carried forwardly and at the same time shaft 18 is driving the sun gear 63 of the reverse drive gear train 60 forwardly so that a compounded resultant forward drive is transmitted to the reverse drive annulus gear 64 that is drivingly connected to the output shaft 81. Acceleration through the starting combination fluid and mechanically generated, torque multiplying, forward drive train continues until certain output shaft speed and torque conditions are achieved and then the transmission control system, subsequently described, automatically causes the brake band 57 to be disengaged from the drum flange 43a and the planetary direct drive clutch D to be engaged to then convert the torque multiplying forward underdrive into a direct drive. Release of band 57 and engagement of clutch D provides for the transmission of a substantially 1:1 ratio forward direct drive from input shaft 8 through converter A to the intermediate driven shaft 18 which latter shaft is directly connected to the output shaft 81 by the engaged direct drive clutch D. Engagement of clutch D on release of brake band 57 locks up two gears of the planetary gear train 50 so that gear train 50 transmits drive to gear train 60 at a 1 to 1 ratio through the planet pinion gear carrier 51. As sun gear 63 of gear train 60 is also rotating at the speed of shaft 18 it is obvious that gear train 60 is also locked up for the transmission of forward drive at a 1 to 1 ratio. With the forward drive ratio hereinabove described, it is possible to get exceptional accelerating power due to the fact that the starting drive torque multiplication ratio of about 2.5 to 1 of the converter is combined with the torque multiplying ratio of approximately 1.7 of the forward driving compounded planetary gear trains 50, 60 and these ratios combine with an axle ratio of between 3.3 and 3.9 to 1 to give an overall starting ratio of between 13.4 and 15.8 to 1. It is thought to be quite obvious that such a transmission will give rocket-like acceleration when associated with some of the current high powered motor vehicle engines.

Reverse drive may be obtained by applying brake band 67 to the carrier member 51 of the reverse planetary gear train 60, the clutch D and band 57 being disengaged at this time. Drive from input shaft 8 is then transmitted through the torque converter A to turbine driven intermediate shaft 18. Shaft 18 drives the sun gear 63 of the reverse drive planetary train 60 forwardly while pinion gear carrier 51 is being held by brake band 67. Accordingly, a combination fluid and mechanically transmitted torque multiplying reverse drive is transmitted to the annulus gear 64 of gear train 60. As annulus 64 is directly connected to the output shaft 81, a combination fluid and mechanically generated, torque multiplying reverse drive is transmittable from the input shaft 8 through the converter A and gear train 60 to the output shaft 81 when band 67 is applied to carrier 51 and clutch D and band 57 are released.

Drivingly connected to the output shaft 81 (see Fig. 2) by the pin 82 is a driving gear 83 of the rear oil pump 84. Oil pump 84 is arranged to draw fluid from the oil sump 26 through conduit 28 and to circulate the discharged pressurized fluid through the torque converter A and the hydraulically operated control and lubrication systems of the transmission unit. As aforementioned, pump 84 is operative whenever the output shaft 81 is rotating above a predetermined speed. Suitable valving such as the valve unit 185 shown in Fig. 4, is provided to insure that pump 84 automatically takes over the supply of pressure fluid for the transmission unit and its control system whenever the speed of output shaft 81 exceeds a certain predetermined relatively low value. This relieves the driving engine for the transmission of the load of front pump 25 after the engine unit has begun to drive the transmission output shaft 81. This pressure regulator valving 185 is described in the co-pending application of William L. Sheppard, Serial No. 98,493, filed June 11, 1949, now Patent No. 2,697,363. Briefly this line pressure regulating valve 185 provides for the supply of one of two different pressures to the hydraulically operated transmission control system depending on whether a forward or a reverse drive ratio has been selected. In general the spring 186 at the left end of valve unit 185 determines the pressure of the fluid that is to be maintained in the line pressure fluid supply conduit 191. Conduit 191 connects the line pressure regulator valve with the manually operated drive ratio selector valve 170. A line pressure of approximately 90 p. s. i. has been found satisfactory for operation in the forward drive ratios whereas a line pressure of approximately 180 p. s. i. has been found advantageous for operation in the reverse drive ratio.

The output conduits from the pair of pressure fluid supply pumps 25 and 84 each include a check valve 183 and 184 respectively to insure a suitable pressure head being maintained in the system during operation. With the arrangement shown the front pump 25 supplies the pressure fluid during initiation of drive by the engine and thereafter, as the output shaft 81 comes up in speed, the rear pump 84 takes over and the front pump 25 merely circulates its output through a by-pass 188, 187b, 189 back to the sump 26. Assuming a normal start under engine power, the pump 25 will supply pressure fluid to conduit 192 that will pressurize the chamber 185a of the valve unit 185. Pressurized fluid in chamber 185a of valve unit 185 is transferred to the chamber 185b at the right end of valve unit 185 by means of the axially extending internal bore 187a in the plunger or spool type valve 187. Pressure fluid in chamber 185b at the right end of valve unit 185 exerts a force against the spring 186 at the left end of valve unit 185 and the spring 186 is so chosen that under normal conditions, when the transmission is set for forward drive, a pressure of approximately 90 p. s. i. will be maintained in the pressure fluid control system. Under 90 p. s. i. pressure in the control system, the plunger valve element 187 is shifted slightly towards the left to permit some pressure fluid from the supply line 192 to pass through valve unit 185 and escape into conduit 193 that supplies the pressurized fluid for the torque converter unit A. As output shaft driven pump 84 comes into operation it also supplies pressurized fluid to the conduit 192 and valve chamber 185a as previously described and the valve 187 is shifted leftward such that valve land 187b of plunger valve 187 is unseated. After the leftward shift of valve land 187b the pressurized fluid from pump 25 will not pass through the check valve 183 but instead will now pass into by-pass conduit 188, through the opened valve land 187b and out into by-pass conduit 189 that redirects this pressure fluid from pump 25 back to the sump 26. Thus on leftward shift of valve land 187b the by-pass 188, 187b, 189 permits the rear pump 84 to take over the supply of pressure fluid and thereby unload the front pump 25.

If the transmission drive ratio selector valve 170 is set for either of the forward drive ratios, Drive or Low respectively, then some of the line pressure fluid from supply conduit 191 that enters manually operable drive ratio selector valve 170 is by-passed from valve 170 to the chamber 185c of pressure regulator valve 185 by the conduit 175. This line pressure fluid in chamber 185c of the valve unit 185, when the selector valve 170 is set for a forward drive ratio, acts on the land 187d of the valve 187 and assists the pressure fluid in chamber 185b in shifting the valve 187 leftward. The 90 p. s. i. line pressure used for forward drive is the result of the action of the line pressure on the two lands at the right end of the valve 187 opposing the spring 186.

If drive ratio selector valve 170 is set for reverse drive then line pressure directed into valve 170 from supply conduit 191 does not pass into the by-pass conduit 175 or into the chamber 185c and thus there is no rightward force exerted on the land 187d of valve 187 when the transmission is set for a reverse drive. Accordingly, the line pressure admitted to the chamber 185b at the right end of valve unit 185 must be high enough to exert a leftwardly directed force on valve 187 sufficient to overcome spring 186 that exerts a rightwardly directed force on the valve 187. It has been found that the spring 186 requires a line pressure of approximately 180 p. s. i. to effect leftward shift of valve 187 when the transmission is set for reverse.

Also drivingly mounted on the output shaft 81 (see Figs. 2 and 4) is a speed responsive, centrifugal force operated, governor mechanism 85 which provides one of the means for automatically controlling operation of this power transmission unit. It is obvious that various types of vehicle speed responsive controls may be used with this transmission but the specific governor mechanism 85 herein disclosed is particularly advantageous due to its simplified design and novel manner of operation. This governor unit is arranged such that it does not require shaft driven gearing or electrically operated control units but instead uses hydraulic pressure supplied by the rear pump 84 in combination with the centrifugal force effect of a pair of output shaft mounted telescopically arranged weights 88, 89 for controlling actuation of the radially movable governor control valve 95 so as to provide a novel type of pressure fluid operated, output shaft speed responsive governor mechanism. This governor mechanism 85 is completely described in the co-pending application of William L. Sheppard, Serial No. 98,493, filed June 11, 1949, now Patent No. 2,697,363.

While the pressure of the fluid discharged from the pump 84 into the governor inlet passage 97 is almost constant and also greater than the pressure of the fluid discharged from the governor mechanism into the governor outlet passage 98, due to the reducing valve action of governor piston valve 95, still, it will be found that the pressure of the fluid discharged from the governor 85, hereafter denoted "governor" pressure, is roughly proportional to the speed of the output shaft 81. Governor 85 thus provides an efficient, accurate, simplified form of speed sensitive control mechanism.

The control system (see Fig. 4) for this transmission includes the manually operable drive ratio selector lever 111 which is rotatably mounted on the conventional motor vehicle steering column 112. Control lever 111 is connected by suitable linkage 113 to the manually operable drive ratio selector valve 170. Valve 170 has four drive ratio positions which are represented in the drawings by the letters R, N, DR and L respectively. These letters correspond to the reverse, neutral, drive and low ratios which ratios are selectively obtainable by manual shift of selector lever 111. The letter V associated with the valve units 170, 185 and with the other valve units of this control system, denotes a vent or drain port for returning the control system pressure fluid to the supply sump 26.

Pressure fluid from either of the supply pumps 25 or 84 is directed into the main supply conduit 191 which is connected to the manually operable drive ratio selector valve 170. The pressure of the fluid in supply conduit 191 is controlled by the pressure regulator valve 185 as previously explained, and this controlled pump supplied pressure is denoted "line" pressure (90 p. s. i.) for purposes of description hereafter. Check valves 183 and 184 maintain a closed pressure fluid supply system. On admission of "line" pressure fluid to the bore 171 of drive ratio selector valve 170 certain of the control mechanisms associated with the control system will be energized and one or the other of the several aforementioned drive ratios will be established. When the manual valve 170 is located in the neutral position the valve lands 172 and 173 of plunger valve element 174 close off the escape of pressurized line fluid from valve bore 171 and thus line pressure fluid cannot pass from supply conduit 191 through valve 170 to activate any of the drive ratio control mechanisms. However, it should be noted that when the manually controlled valve 170 is placed in the neutral position with the vehicle engine running, or when the vehicle is being pushed or towed so that one or the other of pumps 25 or 84 is operating, line pressure fluid from one or the other of pumps 25, 84 can still be directed through conduit 192 to the line pressure regulator valve 185 and through valve 185 to the conduit 193 that supplies pressure fluid to the converter A. Conduit 193 may contain a converter fluid pressure regulator valve 195 to control the pressure of the fluid directed into the converter A. Pressure fluid passing through converter A is passed on to the pressurized transmission lubrication system and to the sump 26 by the conduit 194. Conduit 194 has associated therewith a flow restriction 197 and a finned or radiator-type converter fluid cooling unit 196. The converter pressure regulator valve 195 preferably maintains a pressure of approximately 40 to 50 p. s. i. in the converter at all times.

In either of the forward drive ratio positions, DR, or L of the drive ratio selector valve element 174, "line" pressure fluid from supply conduit 191 will always be directed through the bore 171 of valve unit 170 and into the conduits 119, 119a that connect the manual drive ratio selector valve unit 170 with the torque controlled or substantially torque responsive throttle valve unit 120. Consequently a form of throttle responsive control is always available to cooperate with the driven shaft speed responsive governor 85 to conjointly control automatic operation of this transmission unit in all forward drive ratios. "Line" pressure passed to conduit 119 whenever the ratio selector valve 170 is in either drive or low ratio also fills conduit 119b and is passed into conduit 160 for transfer to the apply side chamber 58b of the servo 58 for drive train 50. Thus planetary 50 is activated for the forward underdrive whenever valve unit 170 is set for drive or low and all starts will be through the underdrive initially.

The substantially torque responsive throttle valve unit 120 (see Fig. 4) has operably associated therewith a kickdown valve-controlled mechanism 230 that is hereinafter described. The substantially torque responsive throttle valve 120 is operated by linkage 116, 117 connected to the throttle control or accelerator pedal 115 for the engine unit E that drives this power transmission unit. Pedal 115 is connected by linkage 117 to the rotatable cam 117a that is adapted to activate the pivotally mounted lever linkage 116. The piston or spool type throttle valve element 121 of valve unit 120 is arranged to be reciprocated by oscillation of the linkage 116. Throttle valve unit plunger or spool element 121 is arranged to reciprocate in the bore 123 of the valve unit 120 and it is connected to the actuating linkage 116 through a compression spring 124. At closed or idle throttle position of the accelerator pedal 115 with the manual control valve 170 set for either of the forward drive ratios, DR or L, the arrangement of the plunger valve 121 in bore 123 of valve 120 is such as to permit pressurized fluid to flow from the supply conduit 119a through valve 120 to conduit 125 and branch conduits 125a and 125b. The pressure of the fluid passing out of valve 120 may be lower than that of the line pressure supplied thereto due to the reducing valve action of valve 120. This reduced or compensated line pressure supplied to conduits 125, 125a and 125b, is denoted "throttle" pressure hereafter.

Admission of "throttle" pressure to the branch conduit 125b conducts this throttle responsive pressurized fluid to the bore 143 at the left end of the direct drive clutch control valve 140. Clutch control valve 140 includes a body with aligned, connected, bores 143, 146 that seat a pair of reciprocable, engageable, relatively movable plunger type valve elements 141 and 145 respectively. The details and the manner of operation of this differential pressure operated direct clutch control valve 140 are quite clearly described in the co-pending application of William L. Sheppard, Serial No. 98,493, filed June 11, 1949 now Patent No. 2,697,363. A compression spring 144 mounted in the valve bore 143 at the left end of valve 140 cooperates with the "throttle" pressure fluid therein to urge connected valve elements 141 and 145 towards the right end of valve unit 140. "Governor" pressure fluid from the governor output conduit 98 applies an output shaft speed responsive pressurized fluid to the bore 146 at the right end of valve unit 140. This "governor" pressure in valve bore 146 at the right end of valve unit 140 tends to urge the engaged plunger type valve elements 141, 145 towards the left end of the valve unit 140. Thus it will be seen that the pressure differential between the throttle responsive pressure fluid and the output shaft speed responsive pressurized fluid, which fluids are applied to opposite ends of the connected spool type valve elements 141, 145 of the valve 140, effects reciprocating movement of the connected shift and pilot valves 141, 145 within valve 140. At relatively low output shaft speeds the "throttle" pressure is greater than the "governor" pressure and the valves 141, 145 are automatically positioned as shown in Fig. 5. As the output shaft speed increases a point is reached where the "governor" pressure in bore 146 exerts a force on the valve train 145, 141 that overcomes the force of the "throttle" pressure on valve train 145, 141 and then valves 145, 141 shift towards the left to a position such as that shown in Figs. 6 and 7. This differential pressure generated shift of the valves 141, 145 is utilized to automatically control operation of the drive clutch D and the servo for the forward drive braking band 57 in the manner set forth hereafter. It should be pointed out at this time that the diameter of pilot valve 145 is greater than the diameter of shift valve 141 and thus the value of the "governor" pressure in valve bore 146 need not actually exceed the value of the "throttle" pressure in valve bore 145 in order to effect a leftward shift of the valves 141, 145. It is the differential forces produced by the opposed "throttle" and "governor" pressures that indicate the shifts of valves 141, 145. Furthermore, it is thought to be obvious that the points of shift of valves 141, 145 will vary considerably depending on the degree of throttle valve opening as well as the output shaft speed at any given time.

Automatic, and substantially simultaneous, operation of the direct drive clutch D and the servo 58 for the forward drive planetary brake band 57 is accomplished by the reciprocatory shift of valves 141, 145 in their bores in valve unit 140. It will be noted that "line" pressure, which is of a relatively high constant pressure, is conducted to the inlet port 149 of direct clutch control valve unit 140 by the conduit 119a whenever the drive ratio selector valve 170 is set for either of the forward drive ratios DR or L respectively. At low output shaft speeds the "throttle" pressure in bore 143 at the left end of valve 140 will position the land 141a of valve element 141 across the "line" pressure inlet port 149 to prevent the transfer of "line" pressure fluid from conduit 119a through the intermediate bore portions 147 of valve 140 and out into the conduit 155. Conduit 155 has branch conduits 155b and 155c that are connected respectively to the apply side 44 of the direct drive clutch D and to the release side 58c of the servo 58. Thus whenever the transmission ratio control valve 170 is set for drive and shift valve 141 is in the position shown in Fig. 5, then "line" pressure is not admitted to conduit 155 and drive will be through the torque converter A and the compounded forward underdrive gear trains 50, 60, due to direct drive clutch D being disengaged and brake band 57 being applied. Likewise, whenever the shift valve 141 is moved to the left to the position shown in Figs. 6 and 7, "line" pressure will be admitted to conduits 155, 155b and 155c and accordingly drive clutch D will be applied and brake band 57 released so that a forward drive is then transmitted through the torque converter A and the locked up gear trains 50, 60 whereby a direct drive of almost a 1 to 1 ratio is transmitted to the output shaft 81. Automatic upshifts and downshifts between the direct drive and the underdrive ratios are accomplished by the hydraulically actuated, automatic, snap action shifting of valves 141, 145 with changes in the differential pressures or forces resulting from the opposed "throttle" and "governor" pressures applied to opposite ends of the valve unit 140. In addition, driver controlled downshifts or kickdowns from the direct drive to the starting underdrive ratio can be accomplished by driver depression of the accelerator pedal 115 to a predetermined open throttle position such that the kickdown valving 230, subsequently described, is brought into operation to accomplish the kickdown.

Admission of "throttle" pressure fluid to conduit 125 not only pressurizes branch conduit 125b and applies throttle pressure to the direct clutch control valve 140, but it also pressurizes the branch conduit 125a that is connected to bore 131 in the left end of the shuttle valve unit 130. Shuttle valve 130 is a mechanism that insures smooth, quick speed ratio changes and it comprises a valve disc 132 that is reciprocably mounted in the bore 131 of the body of valve 130. Disc 131 is connected by the compression spring 133 to the reciprocably mounted, stepped, piston or spool valve element 134. The right end of piston valve 134 is slidably mounted in the valve bore 135 that is located at the right end of shuttle valve unit 130. Valve bore 135 is connected to the conduit 98 that receives "governor" pressure from the governor 85. As previously explained this "governor" pressure is proportional to the speed of the output shaft 81 of this transmission unit. It is thus thought to be apparent that the "throttle" pressure in valve bore 132 and the "governor" pressure in valve bore 135 of the valve unit 130 apply opposed forces to the plunger valve element 134 and provide for controlled reciprocation of the plunger valve element 134 within the valve unit 130. The reciprocatory movement of the shuttle valve element 134 within the shuttle valve body 130 is utilized to control the manner of application and release of the forward drive brake band 57 and the direct drive clutch D. It is thought to be obvious that the shuttle valve 130 is a differential pressure operated valve that is similar to direct clutch control valve 140 but differs therefrom in that the spring 133 that is interposed between the disc 132 and the piston 134 provides a resilient connection between these valve elements whereas in valve 140 the valve elements 141 and 145 are directly connected by rigid force transmitting means. After a predetermined rightward movement of the valve disc 132 it seats on the valve body seat portion 130a and thereafter piston 134 works against the compressed spring 133. The shuttle valve 130 and its manner of cooperation with the direct clutch shift control valve 140 constitutes one of the basic improvements of this invention over the prior art and over applicant's copending application Ser. No. 98,493, filed June 11, 1949, now Patent No. 2,697,363.

From a consideration of Fig. 4 it is thought to be apparent that on movement of the drive ratio control valve element 174 from the neutral to either the drive or low forward drive positions, that "line" pressure fluid will flow from supply conduit 191 through ratio control valve 170, then through the conduit 119b to the shuttle valve inlet port 136 and then into the bore 137 of the shuttle valve 130. During neutral operation at engine idle (Fig. 4) and in drive operation at low vehicle speed (Fig. 5), the shuttle valve element 134 will always be at the right end of the valve bores 130. Accordingly, the valve land 138 will not block off passage of "line" pressure from inlet 136 through the valve bore 137 of valve 130 and thus "line" pressure can pass directly from conduit 119b into the valve body inlet port 136, through bore 137 to the outlet port 139, and thence out into conduit 160 that will apply the "line" pressure to the chamber 58b on the apply side of the forward underdrive planetary servo 58. Application of "line" pressure to chamber 58b of servo 58 tends to apply the brake band 57 and activate the planetary gear box B for the transmission of the starting forward underdrive.

At closed throttle, the throttle actuated valve 120 is closed to prevent the supply of any significant "throttle" pressure to the conduit 125 and branch conduits 125a and 125b so it is obvious that "throttle" pressure can not be transmitted from branch conduit 125a through the shuttle valve bore 131 to the conduit 161 that is connected to the chamber 58a on the apply side of servo 58. Thus at closed throttle there is no significant "throttle" pressure assisting in the application of the underdrive brake band 57. However, as soon as the accelerator 115 is depressed to initiate forward drive, then "throttle" pressure of a progressively rising intensity is passed through connected conduits 125a, 161 and is applied to the chamber 58a on the apply side of servo 58 to assist the "line" pressure in chamber 58b in anchoring the brake band 57 to the drum 43. With the disclosed arrangement it is apparent that as the load that is applied to the output shaft 81 is increased then the accelerator 115 will be further depressed to increase the torque transmitted to shaft 81. Depressing the accelerator 115 increases the "throttle" pressure in line 161 and chamber 58a so that band 57 will be anchored by means that hold in proportion to the load applied. This results from the fact that the variable "throttle" pressure band applying force in servo chamber 58a supplements and assists the substantially constant "line" pressure band applying force in chamber 58b.

As the output shaft speed increases and the "governor" pressure in conduit 98 rises in value, it is obvious that shuttle valve element 134 will be forced towards the left by the "governor" pressure in the bore 135 of shuttle valve 130. Fig. 5 shows the drive position of the shuttle valve element 134 after the vehicle speed has risen above approximately 22 M. P. H. with the indicated axle ratios and at open throttle but prior to shift of the direct clutch control valves 141, 145 from their underdrive positions (see Figs. 4 and 5) to their direct drive positions (see Figs. 6 and 7). From Fig. 5 it will be noted that the land 138 of shuttle valve element 134 has been moved to a position where it blocks the shuttle valve bore 137 and thus "line" pressure from conduit 119b no longer has a free flow path through the bore 137 of valve 130 to the servo chamber 58b. After movement of the shuttle valve 134 to the position shown in Fig. 5 the "line" pressure from branch conduit 119b must by-pass through branch conduit 119c and through the flow restriction valve 162 in order to reach the conduit 160 and the servo chamber 58b. Valve 162 provides for a reduced rate of "line" pressure flow into the conduit 160 and the servo chamber 58b when the vehicle speed is relatively high.

Restriction valve 162 comprises a hollow casing with a perforated plate valve element 163 floatingly mounted therein such that "line" pressure fluid flowing through conduit 119c must pass through the small perforations in plate 163 in order to reach conduit 160. Reverse flow from conduit 160 back through valve 162 and conduit 119c unseats the plate valve 163 and permits a free flow exit of pressure fluid from servo chamber 58b back into supply conduit 119b.

Fig. 6 shows the positions of the control valving after the direct clutch control valve unit 140 has had the valves 141, 145 moved to their upshifted positions for effecting a direct drive through the transmission unit. Fig. 6 represents a condition when the throttle valve is partially open and the vehicle speed is above about 22 M. P. H. for the indicated axle ratio. It will be noted that at this time, due to leftward shift of valve element 134, the land 138 of shuttle valve element 134 still blocks passage through the bore 137 in the shuttle valve such that "line" pressure flow between conduit 119b and 160 must pass through the restriction valve 162. When direct clutch control valve 140 is upshifted to admit "line" pressure from conduit 119a to conduit 155 and its branch conduits 155b and 155c, then the direct clutch D is applied at the same time that "line" pressure is applied to the "release" or "off" chamber 58c of servo 58. Accordingly, the "line" pressure in servo chamber 58c opposes the pressure fluid in band applying chambers 58a and 58b and the pressure fluid in 58b is forced back through the restriction valve 162 to conduit 119b. This fluid force activated removal of the band applying "line" pressure fluid from chamber 58b can be accomplished at a fast rate due to the unseating of the one-way plate valve 163. As a result of the disclosed arrangement, a fast disengagement of the band 57 can be accomplished along with a smooth, quick, substantially simultaneous engagement of the direct drive clutch D.

Fig. 7 shows the control valving when a so-called closed throttle, high speed upshift from the starting forward underdrive to the cruising direct drive has just been accomplished. This condition can exist at any point above substantially 27 M. P. H. vehicle speed for the indicated axle ratios or even at lower speeds if the control valving and axle ratios are adjusted accordingly. It will be noted that the "governor" pressure in shuttle valve chamber 135 at the particular relatively high vehicle speed is sufficient to shift shuttle valve element 134 to the left a considerable distance due to the reduced "throttle" pressure in shuttle valve bore 131 at closed throttle so that now the bore 137 of shuttle valve 130 is directly connected to the branch conduit 155a. As a result of open bore 137, a very fast, smooth upshift from underdrive to direct drive may be accomplished due to means being provided for effecting a rapid removal of the band applying "line" pressure from servo chamber 58b and a simultaneous rapid fill of the direct clutch piston bore 44. With the shuttle valve element 134 positioned as shown in Fig. 7, the "line" pressure that was in servo "on" chamber 58b before the upshift of valves 141, 145 can be quickly forced out of chamber 58b on admission of "line" pressure fluid to the "off" chamber 58c due to the conduits 160, 119c being connected by the shuttle valve bore 137 to the branch conduit 155a. Accordingly, the "line" pressure fluid forced out of "on" chamber 58b is supplied to the conduit 155 and branch conduits 155b and 155c to supplement the "line" pressure from conduit 119a to effect the engagement of direct clutch D and the disengagement of the brake band 57. The disclosed novel valve arrangement eliminates the possibility of a lurch of the vehicle at high speed, closed throttle upshifts that might otherwise result from too slow a release of the band 57 while the clutch D is being applied. Quick, smooth upshifts at high speeds are assured as a result of the shuttle valve arrangement herein disclosed.

Fig. 8 shows the control valving when a kickdown has been effected by the driver so as to cause downshift of the transmission from the direct drive to the forward underdrive ratio prior to the time the direct clutch control valve 140 would automatically effect such a downshift. The kickdown is effected by driver depression of the accelerator pedal 115 to the limit of or to substantially the last 5-10 degrees of throttle opening movement. Such depression of the accelerator pedal will cause linkage 117 to rotate the cam plate 117a (see Figs. 4 and 8) to such a degree that the cam plate finger 117b will be moved into engagement with and cause movement of the plunger rod element 217 inwardly through its bore 218 in the kickdown valve mechanism 230.

Kickdown valve mechanism 230 comprises a casing 231 having a passageway 232 therethrough in which are mounted a one-way, plate-type pressure reducing valve 233 and a one-way, plate-type pressure relief valve 234. Passageway 232 of kickdown valve 230 is connected to the bore chambers 150 and 151 of the direct clutch control valve 140 by the conduits 152 and 153 respectively.

Whenever the accelerator pedal 115 is depressed sufficiently to cause a kickdown the plunger rod 217 is moved into the kickdown valve housing 231 (see Fig. 8) a sufficient distance to unseat the pressure reducing valve 233 and thereby drop the relatively high throttle pressure (90 p. s. i.) in the bores 150 and 151 of the valve 140 to the relatively low pressure (10-15 p. s. i.) that is maintained by the relief valve 234. Reducing the pressure in the bores 150, 151 of the direct clutch control valve 140 by unseating the reducing valve element 233 when valve 140 is set for direct drive (see Figs. 6 and 7) will permit the "throttle" pressure applied to the bore 143 of valve 140 to shift the valves 141, 145 of valve unit 140 to the right to their downshifted underdrive position as shown in Fig. 8.

The branch conduit 153, associated with the kickdown valve 230, includes a flow restriction valve 157, Fig. 9, that prevents the loss of "throttle" pressure throughout the hydraulic control system when the kickdown pressure reducing valve 233 is unseated to reduce the pressure in the bores 150, 151 of direct drive clutch control valve 140.

It will be noted (see Fig. 8) that on high speed kickdowns the "throttle" pressure generated force applied to the shuttle valve piston 134 is not sufficient to completely overcome the "governor" pressure in the bore 135 of the shuttle valve 130 so the land 138 of shuttle valve element 134 still blocks the shuttle valve bore 137. Accordingly, the "line" pressure that is directed from conduit 119b to conduit 160, to cause engagement of band 57 and drum 43, must pass through the restriction valve 163 and this causes a slow final application of the brake band 57 so that a smooth downshift is obtained on kickdown.

Fig. 9 shows the condition of the control valving when the drive ratio control lever 111 has been moved from the drive position to the low position to condition the transmission for the forward drive coast braking ratio. This shift at closed throttle locks the transmission in the underdrive ratio for from Fig. 9 it will be noted that the low position of the drive ratio selector valve 170 permits the "line" pressure from supply conduit 191 to pass into both conduits 119 and 219. Admission of "line" pressure to conduit 219 permits "line" pressure to be applied by the branch conduit 219a to the chamber 220 of clutch control valve 140. Admission of "line" pressure to chamber 220 of valve 140 will downshift the valves 141, 145 and lock these valves in their downshifted positions. Admission of "line" pressure to conduit 219 in low ratio also pressurizes the branch conduit 219b with "line" pressure and this latter branch conduit applies "line" pressure to the bore chamber 221 of the shuttle valve 130. "Line" pressure in chamber 221 of valve 130 shifts the shuttle valve element 134 to the right so that the land 138 of shuttle valve element 134 can not block the bore 137 of the shuttle valve and thus "line" pressure from conduit 119b can pass directly into conduit 160 and into servo "on" chamber 58b without going through restriction valve 162. This free flow of "line" pressure to the servo "on" chamber 58b when the transmission is shifted into low ratio for coast braking provides a rapid yet smooth downshift from direct drive to the underdrive coast ratio. The rapid filling of the servo "on" chamber 58b quickly and firmly applies the underdrive brake band 57 so as to prevent slip of this band and thereby immediately activate the gearing 50, 60 for coast braking.

It is thought to be obvious that the coast ratio is also the low ratio that is used for initiating forward drive. As aforementioned, the direct drive clutch control valve 140 is locked in its downshifted position when the drive ratio selector valve 170 is set for low. Accordingly, no automatic upshift occurs between the low ratio and the drive ratio. After starting in low a manual or driver controlled shift must be made to get into the drive ratio in order to condition the transmission for its automatic operation.

Reverse drive (see Fig. 4) is obtained by shifting the manual drive ratio selector valve 174 to the left so as to connect "line" pressure supply conduit 191 with the reverse drive pressure supply conduit 225. Pressurizing conduit 225 activates servo 68 and applies the reverse drive brake band 67. It will be noted that neither of the conduits 119 nor 219 receive "line" pressure when the drive ratio selector valve 174 is in reverse drive position so the other control valving associated with conduits 119 and 219 is also inactive when reverse drive is being transmitted. As previously explained, the "line" pressure regulator valve 185 of this transmission control system provides a "line" pressure of 180 p. s. i. or double the forward drive "line" pressure (90 p. s. i.) when the transmission is set for reverse drive. William L. Sheppard co-pending application Serial No. 98,493, filed June 11, 1949, contains a complete description of the line pressure regulator control valve 185. Valve 185 forms no part of this invention.

From a consideration of Fig. 10 it will be noted the shift pattern for the drive ratio selector lever 111 is a two plane arrangement wherein the lever 111 is raised above its normal plane to position it in either reverse or low. Also reverse and low are in the same raised plane so the lever 111 can be easily and quickly swung between low and reverse to effect rocking of the vehicle to drive out of a rut or the like. It will also be noted that to move the drive ratio selector lever 111 from neutral to either of the forward drive ratios drive or low, does not require passage of the lever 111 through the reverse drive position. Likewise, reverse drive can be obtained without passing the drive ratio lever 111 through either of the forward drive ratio positions. Such an arrangement prevents accidents that might otherwise occur due to sluggish operation of the transmission controls in cold weather.

The direct clutch control valve 140 has a pressure relief valve 240 connected to the vent chamber 222 thereof. Vent chamber 222 provides the bleed port for releasing the "line" pressure from the direct drive clutch when a downshift is to be effected from direct drive to underdrive or "breakaway." It has been found that the one-way pressure relief valve 240 has a tendency to smooth out the coast drive downshift from direct drive to the "breakaway" underdrive due to the fact that it acts as a flow restriction means during emptying of chamber 222 and thus slows up the downshift of valves 141, 145. This action cushions the application of the underdrive brake band 57. The details of the pressure relief valve 240 are clearly shown in Fig. 11. The valve 240 is mounted directly on the valve body of the direct drive clutch control valve 140 and is connected to the vent chamber 222 so as to control the pressure of the fluid passing out of the chamber 222. Valve 240 is set for about 15–20 p. s. i. for a control system utilizing line pressure of approximately 90 p. s. i. Valve 240 comprises a perforated plate 241 that is fixedly mounted in the bore 242 in the casing of valve 140. Another perforated plate 244 is mounted on top of the pierced plate 241 and is urged into sealing engagement with the plate 241 by the compression spring 245 that is anchored against valve plate 244 by the washer and pin connecting means 246.

On a downshift of the valves 141, 145 the pressure fluid in chamber 222 of valve 140 is forced out of bore 222 through valve 240. Initially this exit of the pressure fluid from bore 222 raises valve plate 244 off plate 241 and this initial flow from chamber 222 is relatively fast through the several perforations 247 in plate 241. After the initial rapid bleed off of the pressure fluid in bore 222 the pressure in bore 222 drops and the valve plate 244 seats on plate 241. Thereafter during the final portion of the downshift there is a restricted flow from bore 222 through the perforation 248 in outer plate 244. This restricted discharge from valve chamber 222 slows up the downshift and cushions the engagement of the underdrive brake band so that clutch D is completely released by the time band 57 is applied. The result of this bleed valve action of the valve 240 is that a quiet smooth downshift is obtained at all times.

The several valves that have been described as comprising the control system for this power transmission unit are contained within a valve body 300 (see Figs. 2, 12, 14, 15 and 17) that is detachably mounted by means of its support plate 301 in the sump area 26 beneath the gearing of the gear box B. As valve body 300 is enclosed by gear box housing 42 and the housing pan 302, it is obvious that oil vented from the several vents V, Fig. 4, of the valve body 300 will be discharged into the sump 26 such that it may be recirculated by the pumps 25 and 84 after the oil has passed through the strainer 299.

Valve body 300 includes a removable cover or end plate 305 that has recesses therein to provide the bore chambers 143, 131 and 232 for the direct drive clutch control valve 140, the shuttle valve 130 and the kickdown valve 230 respectively. The arrangement of the several valves within the valve body 300 is thought to be quite obvious from an inspection of Fig. 15. Operation of the several valves by the driver is accomplished by the driver through a pair of relatively rotatable shafts 306 and 307 that are concentrically arranged within the valve body 300 (see Figs. 12, 14 and 18). From an inspection of Figs. 12 and 18 it will be noted that linkage is connected to each of these rotatable shafts 306 and 307 such that movement of the drive ratio control lever 111 and the accelerator 115 will respectively operate linkage 113 and 116. Movement of the drive ratio control lever 111 causes linkage 113 to rotate the shaft 306 and turn the attached lever plate 308 in an arc about shaft 306. Lever plate 308 has a finger 309 that is engaged with the drive ratio control valve element 174 so that movement of lever 111 will control the position of the drive ratio valve 174 within its bore in the valve body 300. A spring detent mechanism 310 is provided to lock the lever plate 308 in each of its selected positions.

The accelerator pedal 115 is connected by the linkage 116a to the engine carburetor 311 and by the linkage 116b to the shaft 307 of valve body 300 such that depression of accelerator 115 will cause rotation of the shaft 307 clockwise. Lever plate 117a (see Fig. 15) is drivingly connected to the shaft 307 and thus it is thought to be obvious that depression of accelerator 115 will cause the cam surface or edge 117c of plate 117a to actuate the lever linkage 116 and operate the throttle responsive valve element 121 of valve body 300. As cam plate 117a carries the finger element 117b, it is thought to be obvious that a more or less full depression of the accelerator 115 will move the finger 117b of plate 117a into engagement with the kickdown valve push rod 217 such that push rod 217 will unseat pressure reducing valve 233 and dump the throttle pressure in chamber 150 of valve 140 so as to effect a downshift to the right (see Figs. 7 and 8) of the valves 141, 145.

The kickdown valve unit 230 of this transmission control system provides a hydraulic means for preventing accidental kickdown during normal operation of the throttle valve accelerator pedal 115. It will be noted from Figs. 6 and 7 that when the valving 141, 145 of clutch control valve 140 is in its upshifted or direct drive position, that then conduit 152 is filled with throttle pressure fluid and furthermore, on opening the throttle valve to cause a kickdown this throttle pressure in conduit 152 will be approximately 90 p. s. i. Accordingly, the throttle pressure in conduit 152 provides a substantial force that tends to hold kickdown valve 233 seated. To unseat valve 233 by the movement of plunger rod 217 against valve 233 thus requires a substantial effort on the part of the vehicle operator over that normally required for accelerator depression. This additional effort that must be expanded by the driver to accomplish a kickdown prevents accidental kickdowns. Another advantageous feature of the kickdown valve 230 is that once valve 233 is unseated it bleeds valve bore 150 so that the pressure therein is reduced such that a continued force on the accelerator 115 is not necessary. This is an improvement over a spring device wherein the pedal 115 must be continuously held down to completion of the kickdown.

The transmission unit and the control system herein disclosed provide a highly flexible, economically produced and operated drive train unit that is relatively simple yet designed to give maximum performance. The control valving that includes the shuttle valve 130, the dump valve 240, the restriction valve 162 and the kickdown valving 230 are designed and arranged such that smooth, fast drive ratio shifts are obtained at all speeds and under all driving conditions.

I claim:

1. In an hydraulically operated control system for an engine driven motor vehicle power transmission unit, a pair of pressure fluid operated, speed ratio drive, control mechanisms arranged for alternate activation to provide means for selectively transmitting a pair of different speed ratio drives through said transmission unit, a source of line pressure fluid, a first conduit means connecting said source of line pressure fluid to each of said control mechanisms, a first automatically controlled, differential pressure operated, valve unit connected to said first conduit means between the line pressure supply source and the said control mechanisms, a source of pressure fluid having a pressure responsive to the speed of the motor vehicle, a second conduit means connecting said source of vehicle speed responsive pressure fluid to a first portion of said first differential pressure operated valve, a throttle valve for controlling the torque transmitted by the motor vehicle engine, a source of pressure fluid controlled by the movement of said throttle valve providing a source of pressure fluid having a pressure responsive to the degree of opening of the engine throttle valve, a third conduit means connecting the source of throttle valve responsive pressure fluid to a second portion of the first differential pressure operated valve whereby the vehicle speed responsive pressure fluid and the throttle valve responsive pressure fluid act upon the first differential pressure operated valve in opposed relationship and cooperatively control the passage of line pressure to said control mechanisms, and a second differential pressure operated valve connected to said first conduit means between said first differential pressure operated valve and said control mechanisms, said second differential pressure operated valve having the aforementioned vehicle speed responsive pressure fluid and the aforementioned throttle valve responsive pressure fluid applied thereto in opposed relationship so as to conjointly control said second differential pressure operated valve, a fourth conduit means connecting said source of line pressure fluid through said second differential pressure operated valve to one of said control mechanisms whereby passage of line pressure from said fourth conduit means to said one control mechanism through said second differential pressure operated valve is dependent on the relationship existing between the vehicle speed responsive pressure fluid and the throttle valve responsive pressure fluid applied to said second differential pressure operated valve.

2. In an hydraulically operated control system for an engine driven motor vehicle power transmission unit, a pair of pressure fluid operated, speed ratio drive, control mechanisms arranged for alternate activation to provide means for selectively transmitting a pair of different speed ratio drives through said transmission unit, a source of line pressure fluid, a first conduit means connecting said source of line pressure fluid to each of said control mechanisms, a first automatically controlled, differential pressure operated, valve unit connected to said first conduit means between the line pressure supply source and the said control mechanisms, a source of pressure fluid having a pressure responsive to the speed of the motor vehicle, a second conduit means connecting said source of vehicle speed responsive pressure fluid to a first portion of said first differential pressure operated valve, a throttle valve for controlling the torque transmitted by the motor vehicle engine, a source of pressure fluid controlled by the movement of said throttle valve providing a source of pressure fluid having a pressure responsive to the degree of opening of the engine throttle valve, a third conduit means connecting the source of throttle valve responsive pressure fluid to a second portion of the first differential pressure operated valve whereby the vehicle speed responsive pressure fluid and the throttle valve responsive pressure fluid act upon the first differential pressure operated valve in opposed relationship and cooperatively control the passage of line pressure to said control mechanisms, a second differential pressure operated valve connected to said first conduit means between said first differential pressure operated valve and said control mechanisms, said second differential pressure operated valve having the aforementioned vehicle speed responsive pressure fluid and the aforementioned throttle valve responsive pressure fluid applied thereto in opposed relationship so as to conjointly control said second differential pressure operated valve, a fourth conduit means connecting said source of line pressure fluid through said second differential pressure operated valve to one of said control mechanisms whereby passage of line pressure from said fourth conduit means to said one control mechanism through said second differential pressure operated valve is dependent on the relationship existing between the vehicle speed responsive pressure fluid and the throttle valve responsive pressure fluid applied to said second differential pressure operated valve, and a bypass in said fourth conduit means providing means to bypass line pressure from its source around said second differential pressure operated valve to said one control mechanism.

3. The control system set forth in claim 2 including a pressure fluid flow restriction means in said bypass line.

4. The control system set forth in claim 2 wherein a fifth conduit means applies the aforementioned throttle valve responsive pressure fluid to said one control mechanism in a manner so as to assist the action of the line pressure applied to said one control mechanism.

5. The control system set forth in claim 2 including a driver operable pressure fluid reducing valve connected to a throttle valve responsive pressure fluid receiving chamber of said first differential pressure operated valve to provide means for driver overrule of the normally automatic operation of said first differential pressure operated valve.

6. In an hydraulically operated control system for an engine driven motor vehicle power transmission unit, a pair of pressure fluid operated, speed ratio drive, control mechanisms arranged for alternate activation to provide means for selectively transmitting a pair of different speed ratio drives through said transmission unit, a source of line pressure fluid, a first conduit means connecting said source of line pressure fluid to each of said control mechanisms, a first automatically controlled, differential pressure operated, valve unit connected to said first conduit means between the line pressure supply source and the said control mechanisms, a source of pressure fluid having a pressure responsive to the speed of the motor vehicle, a second conduit means connecting said source of vehicle speed responsive pressure fluid to a first portion of said first differential pressure operated valve, a throttle valve for controlling the torque transmitted by the motor vehicle engine, a source of pressure fluid controlled by the movement of said throttle valve providing a source of pressure fluid having a pressure responsive to the degree of opening of the engine throttle valve, a third conduit means connecting the source of throttle valve responsive pressure fluid to a second portion of the first differential pressure operated valve whereby the vehicle speed responsive pressure fluid and the throttle valve responsive pressure fluid act upon the first differential pressure operated valve in opposed relationship and cooperatively control the passage of line pressure to said control mechanisms, and a pressure relief valve connected to said first differential pressure operated valve in such a manner as to control the rate of application and release of said control mechanisms.

7. In an hydraulically operated control system for an engine driven motor vehicle power transmission unit, a pair of pressure fluid operated, speed ratio drive, control mechanisms arranged for alternate activation to provide means for selectively transmitting a pair of different speed ratio drives through said transmission unit, a source of line pressure fluid, a first conduit means connecting said source of line pressure fluid to each of said control mechanisms, a first automatically controlled, differential pressure operated, valve unit connected to said first conduit means between the line pressure supply source and the said control mechanisms, a source of pressure fluid having a pressure responsive to the speed of the motor vehicle, a second conduit means connecting said source of vehicle speed responsive pressure fluid to a first portion of said first differential pressure operated valve, a throttle valve for controlling the torque transmitted by the motor vehicle engine, a source of pressure fluid controlled by the movement of said throttle valve providing a source of pressure fluid having a pressure responsive to the degree of opening of the engine throttle valve, a third conduit means connecting the source of throttle valve responsive pressure fluid to a second portion of the first differential pressure operated valve whereby the vehicle speed responsive pressure fluid and the throttle valve responsive pressure fluid act upon the first differential pressure operated valve in opposed relationship and cooperatively control the passage of line pressure to said control mechanisms, means operative by a predetermined movement of said first differential pressure operated valve whereby the throttle valve responsive pressure fluid applied to said first differential pressure operated valve is arranged to coact with the vehicle speed responsive pressure fluid applied to said first differential pressure operated valve to effect rapid shift thereof, and a driver operable pressure reducing valve connected to said last mentioned means to provide means for the driver to overrule the automatic operation of said first differential pressure operated valve.

8. The hydraulically operated control system set forth in claim 1 wherein the said first conduit means is connected to the release side of said one control mechanism and to the apply side of the other control mechanism while said fourth conduit means is connected to the apply side of said one control mechanism.

9. In a power transmission unit adapted to be driven by a throttle valve controlled engine and comprising an input shaft, an output shaft, gearing connectible between said shafts to provide for transmission of an underdrive therebetween, a clutch connectible between said shafts to provide for the transmission of a direct drive therebetween, a first pressure fluid operated mechanism to control said gearing and a second pressure fluid operated mechanism to control said clutch; a pressure fluid operated control system comprising a shaft driven source of line pressure fluid, a first differential pressure operated valve connected by first conduit means to said source of line pressure fluid and to said control mechanisms to conjointly control said pressure fluid operated control mechanisms, a source of pressure fluid responsive to the speed of one of said shafts connected to said first differential pressure operated valve, a source of pressure fluid responsive to the opening of the engine throttle valve connected to said first differential pressure operated valve in opposed relation to the shaft speed responsive pressure fluid applied thereto, a second differential pressure operated valve connected by a second conduit means to said source of line pressure fluid and to the pressure fluid operated control mechanism for said gearing, conduit means connecting said source of shaft speed responsive and throttle valve responsive pressure fluid to said second differential pressure operated valve in opposed relationship whereby the differential pressure therebetween controls the passage of line pressure through said second differential pressure operated valve, and a third conduit means connecting said second differential pressure operated valve to said first conduit means.

10. In a power transmission unit adapted to be driven by a throttle valve controlled engine and comprising an input shaft, an output shaft, gearing connectible between said shafts to provide for transmission of an underdrive therebetween, a clutch connectible between said shafts to provide for the transmission of a direct drive therebetween, a first pressure fluid operated mechanism to control said gearing and a second pressure fluid operated mechanism to control said clutch; a pressure fluid operated control system comprising a shaft driven source of line pressure fluid, a first differential pressure operated valve connected by first conduit means to said source of line pressure fluid and to said control mechanisms to conjointly control said pressure fluid operated control mechanisms, a source of pressure fluid responsive to the speed of one of said shafts connected to said first differential pressure operated valve, a source of pressure fluid responsive to the opening of the engine throttle valve connected to said first differential pressure operated valve in opposed relation to the shaft speed responsive pressure fluid applied thereto, a second differential pressure operated valve connected by a second conduit means to said source of line pressure fluid and to the pressure fluid operated control mechanism for said gearing, conduit means connecting said source of shaft speed responsive and throttle valve responsive pressure fluid to said second differential pressure operated valve in opposed relationship whereby the differential pressure therebetween controls the passage of line pressure through said second differential pressure operated valve, a third conduit means connecting said second differential pressure operated valve to said first conduit means, and a bypass conduit in said third conduit means to bypass line pressure around said second differential pressure operated valve.

11. The transmission and control system therefor set forth in claim 10 and including a one-way fluid flow restriction means in said bypass conduit.

12. The transmission and control system therefor set forth in claim 9 and including a driver operable pressure reducing valve means connected to the first differential pressure operated valve that is adapted to vary the differential pressure relationship existing between the shaft speed responsive pressure fluid and the throttle valve responsive pressure fluid so as to provide for control of said first differential pressure operated valve by the driver.

13. The transmission and control system therefor set forth in claim 12 and including a pressure fluid flow restriction valve connected to the said pressure reducing valve means on the pressurized side thereof to prevent sudden loss of the throttle pressure head on opening of the pressure reducing valve.

14. The transmission and control system therefor set forth in claim 10 and including a pressure relief valve connected to the first differential pressure operated valve and arranged to restrict flow of the throttle responsive pressure fluid through said first differential pressure operated valve.

15. The transmission and control system therefor set forth in claim 9 wherein said second differential pressure operated valve is arranged to control the interconnection of said first conduit means with said second conduit means so as to selectively provide a free flow pressure fluid passage between said control mechanisms to provide for rapid operation thereof.

16. In a power transmission unit adapted to be driven by a throttle valve controlled engine and comprising an input shaft, an output shaft, gearing connectible between said shafts to provide for transmission of an underdrive therebetween, a clutch connectible between said shafts to provide for the transmission of a direct drive therebetween, a first pressure fluid operated mechanism to control said gearing and a second pressure fluid operated mechanism to control said clutch; a pressure fluid operated control system comprising a shaft driven source of line pressure fluid, a first differential pressure operated valve connected by first conduit means to said source of line pressure fluid and to said control mechanisms to conjointly control said pressure fluid operated control mechanisms, a source of pressure fluid responsive to the speed of one of said shafts connected to said first differential pressure operated valve, a source of pressure fluid responsive to the opening of the engine throttle valve connected to said first differential pressure operated valve in opposed relation to the shaft speed responsive pressure fluid applied thereto, a second differential pressure operated valve connected by a second conduit means to said source of line pressure fluid and to the pressure fluid operated control mechanism for said gearing, and conduit means connecting said source of shaft speed responsive and throttle valve responsive pressure fluid to said second differential pressure operated valve in opposed relationship whereby the differential pressure therebetween controls the passage of line pressure through said second differential pressure operated valve.

17. A valve body comprising a plurality of interconnected valve bores, a first operator actuable valve mounted in one of said bores, a second operator actuable valve mounted in another of said bores, movement of said first and second valves controlling admission of pressure fluid to the several interconnected valve bores, a pair of concentrically arranged rotatable shafts journaled in said valve body, one of said shafts having a connection to said first valve to effect actuation thereof and the other of said shafts having a connection to said second valve to effect actuation thereof, the connection of said second shaft to said second valve including resilient means to transmit the force between the second shaft and the second valve, and a third normally inactive valve actuable by extended actuation of said second shaft to modify and overrule the normal operation of said other valves.

18. In an hydraulically operated control system for an engine driven motor vehicle power transmission unit including an engine throttle valve control, a pair of pressure fluid operated, speed ratio drive control mechanism arranged to provide means for selectively transmitting a pair of different speed ratio drives through said transmission unit, a first source of substantially constant intensity pressure fluid, a first conduit means connecting said source of constant intensity pressure fluid to each of said drive control mechanisms, a first automatically operated valve unit connected to said first conduit means and arranged to control application of said constant intensity pressure fluid to said drive control mechanisms, a second source of pressure fluid responsive to the speed of said vehicle, a third source of pressure fluid responsive to the movement of said engine throttle valve, a differential pressure operated valve having opposed portions thereof connected respectively to said source of vehicle speed responsive pressure fluid and said source of throttle valve responsive pressure fluid so as to be actuated thereby, and a second conduit means having a fluid flow restriction therein connecting said first source of constant intensity pressure fluid to one of said drive control mechanisms, said second conduit means being connected to said differential pressure operated valve so as to provide a non-restrictive by-pass channel for transmitting the constant intensity pressure fluid to said one of said drive control mechanisms when said differential pressure operated valve is in a predetermined condition.

19. In an hydraulically operated control system for an engine driven motor vehicle power transmission unit including an engine throttle valve control, a pair of pressure fluid operated, speed ratio drive control mechanisms arranged to provide means for selectively transmitting a pair of different speed ratio drives through said transmission unit, a first source of substantially constant intensity pressure fluid, a first conduit means connecting said source of constant intensity pressure fluid to each of said drive control mechanisms, a first automatically operated valve unit connected to said first conduit means and arranged to control application of said constant intensity pressure fluid to said drive control mechanisms, a second source of pressure fluid responsive to the speed of said vehicle, a third source of pressure fluid responsive to the movement of said engine throttle valve, a differential pressure operated valve having opposed portions thereof connected respectively to said source of vehicle speed responsive pressure fluid and said source of throttle valve responsive pressure fluid so as to be actuated thereby, a second conduit means having a fluid flow restriction therein connecting said first source of constant intensity pressure fluid to one of said drive control mechanisms, said second conduit means being connected to said differential pressure operated valve so as to provide a non-restrictive by-pass channel for transmitting the constant intensity pressure fluid to said one of said drive control mechanisms when said differential pressure operated valve is in a predetermined condition, and conduit means connecting said source of throttle valve responsive pressure fluid to said one of said drive control mechanisms such that said throttle valve responsive pressure fluid and said constant intensity pressure fluid cooperate to control said one of said drive ratio control mechanisms.

20. In an hydraulically operated power transmission control system including a fluid operated drive control mechanism, a shift valve to automatically control application of a first pressure fluid to said drive control mechanism, a shuttle valve unit comprising a bore having a pair of relatively shiftable valves therein, resilient means extending between said valves and resisting movement of the valves towards each other, a first chamber at one end of said valve unit seating one valve and adapted to receive a second variable intensity pressure fluid, a second chamber at the other end of said valve unit seating the other valve and adapted to receive a third variable intensity pressure fluid, a first conduit means connecting said first source of pressure fluid to the drive control mechanism, said first conduit means including a one-way flow restriction means to retard the application of said first pressure fluid to said drive control mechanism, a second conduit means connecting the source of said first pressure fluid to said drive control mechanism through the bore of said shuttle valve whereby shift of said other valve in the bore of said shuttle valve will control application of said first pressure fluid to said drive control mechanism through said second conduit means.

21. In an hydraulically operated power transmission control system including a fluid operated drive control mechanism, a shift valve to automatically control application of a first pressure fluid to said drive control mechanism, a shuttle valve unit comprising a bore having a pair of relatively shiftable valves therein, resilient means extending between said valves and resisting movement of the valves towards each other, a first chamber at one end of said valve unit seating one valve and adapted to receive a second variable intensity pressure fluid, a second chamber at the other end of said valve unit seating the other valve and adapted to receive a third variable intensity pressure fluid, a first conduit means connecting said first source of pressure fluid to the drive control mechanism, said first conduit means including a one-way flow restriction means to retard the application of said first pressure fluid to said drive control mechanism, a second conduit means connecting the source of said first pressure fluid to said drive control mechanism through the bore of said shuttle valve whereby shift of said other valve in the bore of said shuttle valve will control application of said first pressure fluid to said drive control mechanism through said second conduit means and conduit means connecting the source of the second variable pressure fluid to the drive control mechanism such that the first and second pressure fluids conjointly actuate the drive control mechanism.

22. In an hydraulically operated control system, a pressure fluid operated control mechanism arranged for activation to provide means for selectively operating a device, a source of constant pressure fluid, a first conduit means connecting said source of constant pressure fluid to said control mechanism, an automatically actuated, differential pressure operated shift valve connected to said first conduit means between the constant pressure fluid supply source and the said control mechanism, a first source of variable pressure fluid, a second conduit means connecting said first source of variable pressure fluid to a first portion of said differential pressure operated shift valve, a second source of variable pressure fluid, a third conduit means connecting said second source of variable pressure fluid to a second portion of said differential pressure operated shift valve whereby the first and second variable pressure fluids act upon the differential pressure operated shift valve in opposed relationship and cooperatively effect shift of said valve to control the passage of the constant pressure fluid to said control mechanism, and a pressure relief valve connected to a portion of the differential pressure operated shift valve acted on by one of said variable pressure fluids, said relief valve being arranged in such a manner as to control the rate of shift of said shift valve.

23. In an hydraulically operated control system, a pressure fluid operated control mechanism arranged for activation to provide means for selectively operating a device, a source of constant pressure fluid, a first conduit means connecting said source of constant pressure fluid to said control mechanism, an automatically actuated, differential pressure operated shift valve connected to said first conduit means between the constant pressure fluid supply source and the said control mechanism, a first source of variable pressure fluid, a second conduit means connecting said first source of variable pressure fluid to a first portion of said differential pressure operated shift valve, a second source of variable pressure fluid, a third conduit means connecting said second source of variable pressure fluid to a second portion of said differential pressure operated shift valve whereby the first and second variable pressure fluids act upon the differential pressure operated shift valve in opposed relationship and cooperatively effect shift of said valve to control the passage of the constant pressure fluid to said control mechanism, an operator operable pressure reducing valve connected to a portion of said shift valve that is acted on by one of said variable pressure fluids to provide means permitting the operator to overrule the normally automatic operation of said differential pressure operated shift valve, and a pressure relief valve connected to said pressure reducing valve arranged to control the rate of shift of said shift valve.

24. In an hydraulically operated control system including a fluid operated control mechanism and a first source of constant pressure fluid connected thereto by conduit means, a shuttle valve unit connected to said conduit means to control delivery of constant pressure fluid to said control mechanism comprising a bore having a pair of relatively shiftable valves therein, resilient means extending between said valves and resisting movement of the valves towards each other, a first chamber at one end of said valve unit seating one valve and arranged to receive a first variable intensity pressure fluid, a second chamber at the other end of said valve unit seating the other valve and arranged to receive a second variable intensity pressure fluid, a by-pass conduit connecting said source of constant pressure fluid to said control mechanisms including a one-way flow restriction means to retard the application of said first constant pressure fluid to said drive control mechanism by way of said by-pass conduit, shift of said valves in the bore of said shuttle valve controlling application of said first constant pressure fluid to said drive control mechanism through said first conduit means.

25. In an hydraulically operated control system including a fluid operated control mechanism and a first source of constant pressure fluid connected thereto by conduit means, a shuttle valve unit connected to said conduit means to control delivery of constant pressure fluid to said control mechanism comprising a bore having a pair of relatively shiftable valves therein, resilient means extending between said valves and resisting movement of the valves towards each other, a first chamber at one end of said valve unit seating one valve and arranged to receive a first variable intensity pressure fluid, a second chamber at the other end of said valve unit seating the other valve and arranged to receive a second variable intensity pressure fluid, a by-pass conduit connecting said source of constant pressure fluid to said control mechanisms including a one-way flow restriction means to retard the application of said first constant pressure fluid to said drive control mechanism by way of said by-pass conduit, shift of said valves in the bore of said shuttle valve controlling application of said first constant pressure fluid to said drive control mechanism through said first conduit means, and conduit means connecting the source of one of the variable pressure fluids to the control mechanism such that the first constant pressure fluid and one of the variable pressure fluids conjointly actuate and control mechanism.

26. In an hydraulically operated control system including a first source of pressurized fluid and conduit means connected thereto, a shuttle valve unit connected to said conduit means to control passage of said first pressurized fluid through said conduit means comprising a bore having a pair of relatively shiftable valves therein, resilient means extending between said valves and resisting movement of the valves towards each other, a first chamber at one end of said valve unit seating one valve and arranged to receive a second pressurized fluid, a second chamber at the other end of said valve unit seating the other valve and arranged to receive a third pressurized fluid, and a by-pass conduit connecting said first source of pressurized fluid around said shuttle valve, said by-pass conduit including a one-way flow restriction means to retard the passage of said first pressurized fluid through said by-pass conduit, the shift of said valves in the bore of said shuttle valve controlling passage of said first pressurized fluid through said conduit means.

27. In a pressure fluid operated control system for the transmission of a motor vehicle having a throttle valve, a source of substantially constant pressure fluid, a pair of pressure fluid operated mechanisms adapted to be selectively operated by selective connection to said source of substantially constant pressure fluid, a first conduit means connecting said source of substantially constant pressure fluid to each of said pressure fluid operated mechanisms and to each other, a control valve connected to said first conduit means, a source of vehicle speed responsive pressure fluid connected to said control valve to urge said valve to a position whereby said pressure fluid operated mechanisms are interconnected for the transfer of said substantially constant intensity pressure fluid therebetween, and a source of pressure fluid responsive to the degree of opening of the throttle valve connected to said control valve to urge said control valve to a position closing off interconnection between said pair of pressure fluid operated mechanisms.

28. In a pressure fluid operated control system for the transmission of a motor vehicle having a throttle valve, a source of substantially constant pressure fluid, a pair of pressure fluid operated mechanisms adapted to be selectively operated by selective connection to said source of substantially constant pressure fluid, a first conduit means connecting said source of substantially constant pressure fluid to each of said pressure fluid operated mechanisms and to each other, a control valve connected to said first conduit means, a source of vehicle speed responsive pressure fluid connected to said control valve to urge said valve to a position whereby said pressure fluid operated mechanisms are interconnected for the transfer of said substantially constant intensity pressure fluid therebetween, a source of pressure fluid responsive to the degree of opening of the throttle valve connected to said control valve to urge said control valve to a position closing off interconnection between said pair of pressure fluid operated mechanisms, and a restrictor valve connected to said first conduit means and to said control valve so as to provide a flow restricted conduit for supply of said substantially constant pressure fluid to one of said pressure fluid operated mechanisms when the force exerted on said control valve by said vehicle speed responsive pressure fluid overcomes the force exerted on said control valve by the pressure fluid responsive to the degree of throttle valve opening.

References Cited in the file of this patent

UNITED STATES PATENTS

| | | |
|---|---|---|
| 2,204,872 | Thompson | June 18, 1940 |
| 2,221,393 | Carnegie | Nov. 12, 1940 |
| 2,516,208 | Hasbany | July 25, 1950 |
| 2,604,197 | Livermore | July 22, 1952 |
| 2,633,035 | Livermore | Mar. 31, 1953 |
| 2,640,373 | Jandasek | June 2, 1953 |
| 2,645,135 | Frank | July 14, 1953 |
| 2,645,137 | Roche | July 14, 1953 |
| 2,648,992 | Vincent | Aug. 16, 1953 |

FOREIGN PATENTS

| | | |
|---|---|---|
| 607,120 | Great Britain | Aug. 26, 1948 |
| 966,238 | France | Oct. 4, 1950 |